Sept. 27, 1938.  P. A. KINZIE ET AL  2,131,051
INTERNAL STEM OPERATED TRACTOR GATE
Filed Dec. 28, 1935  7 Sheets-Sheet 6
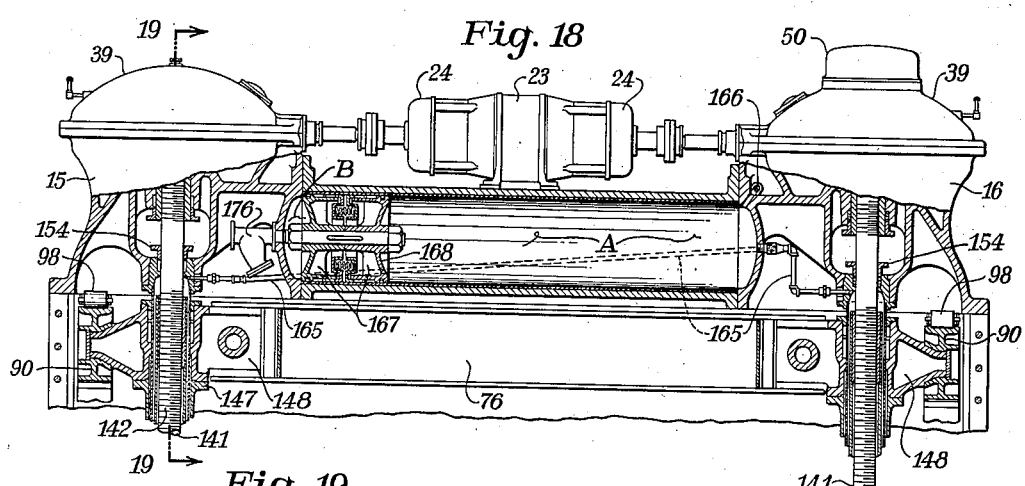
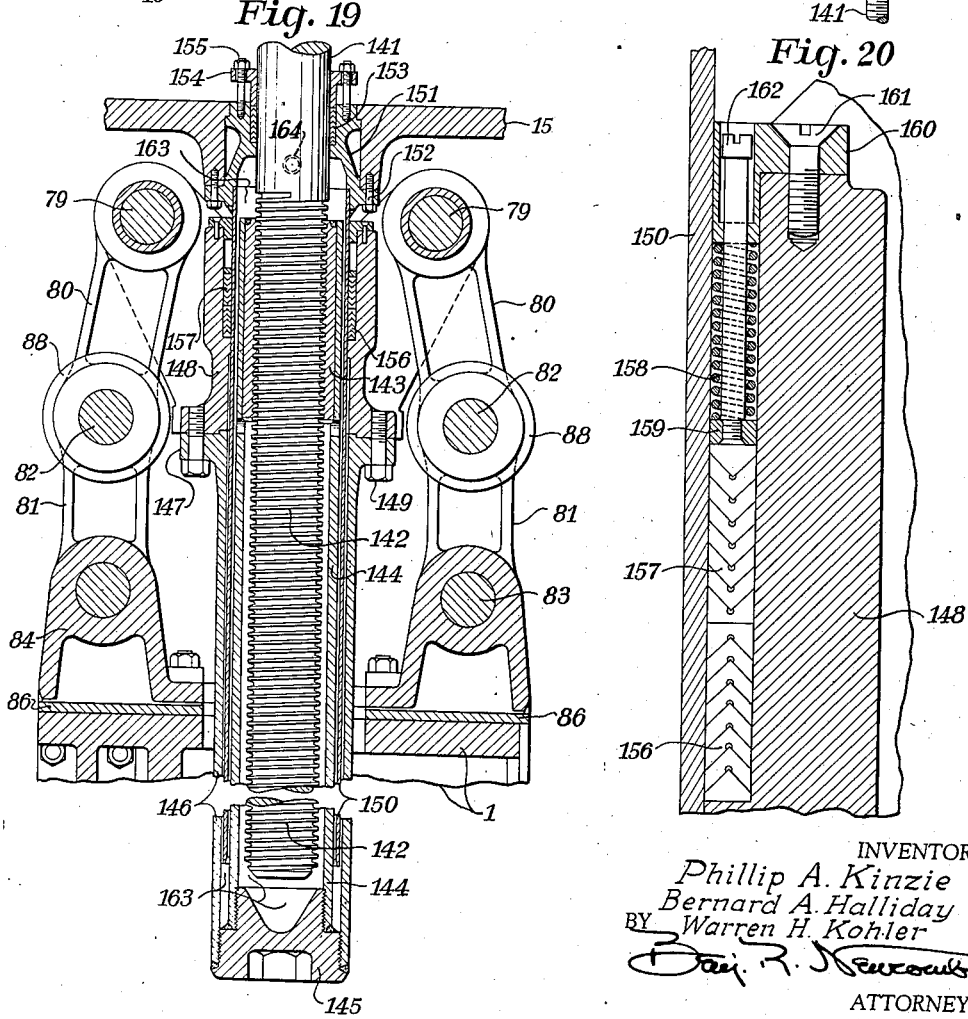
INVENTORS.
Phillip A. Kinzie
Bernard A. Halliday &
BY Warren H. Kohler
ATTORNEY.

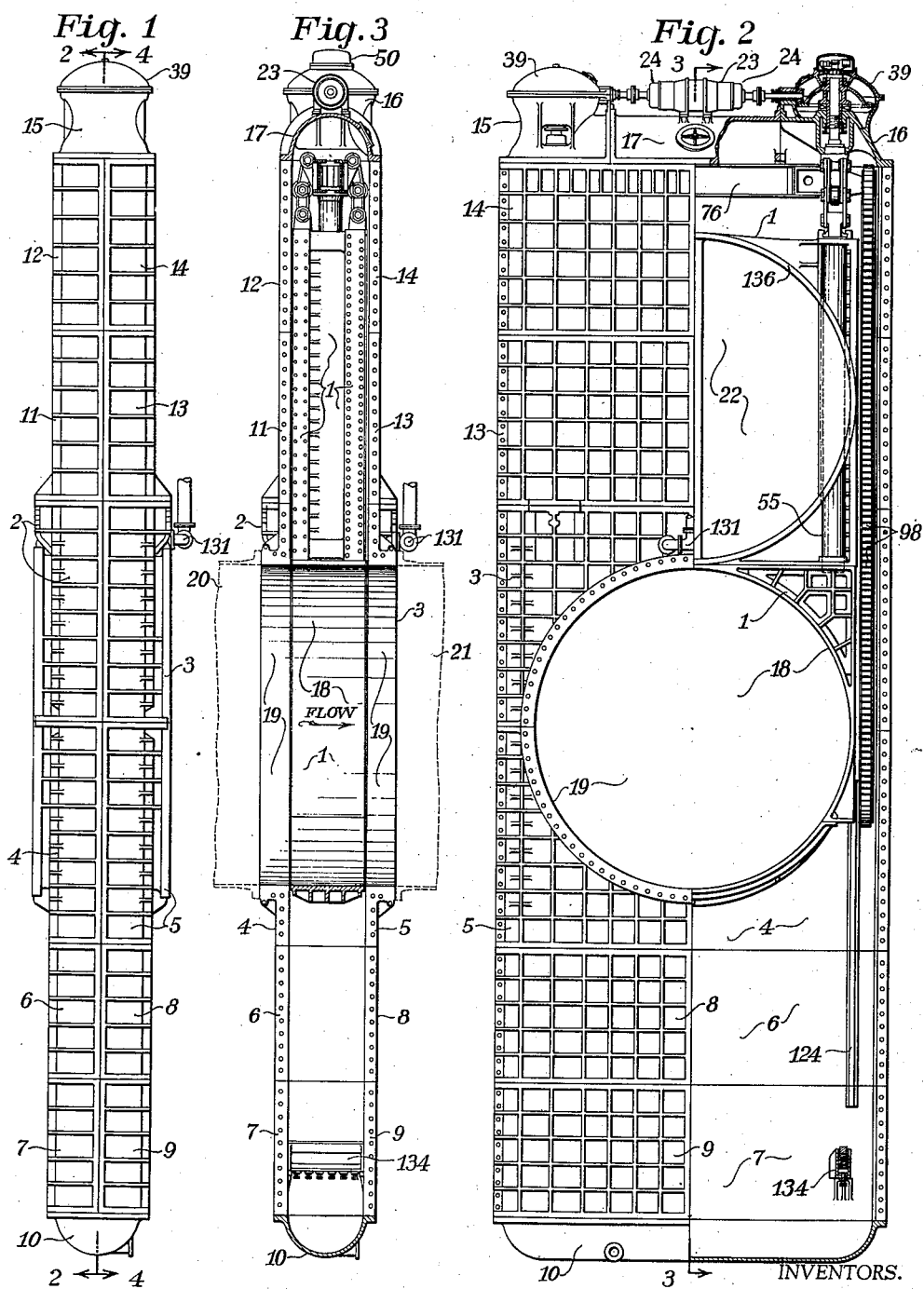

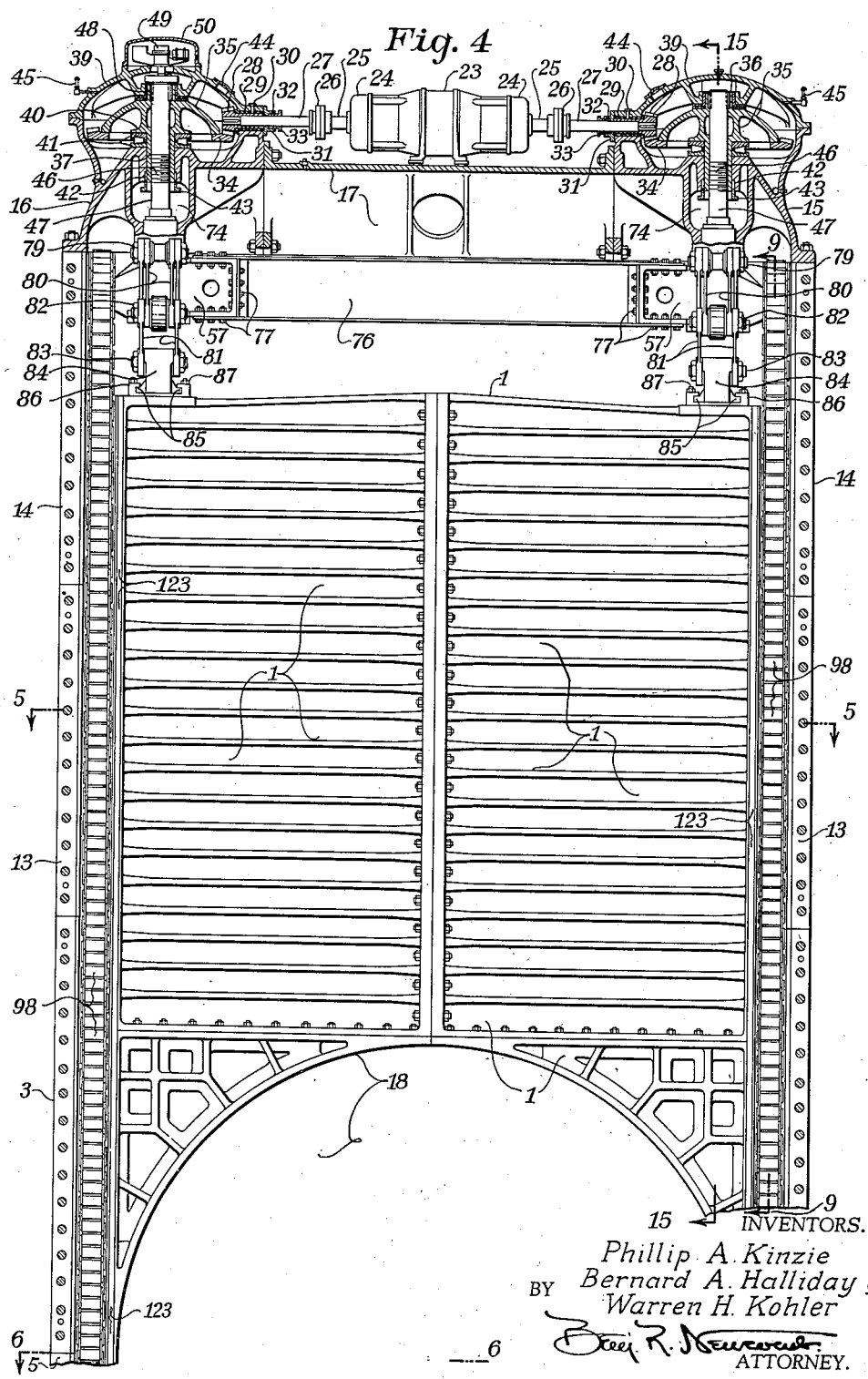

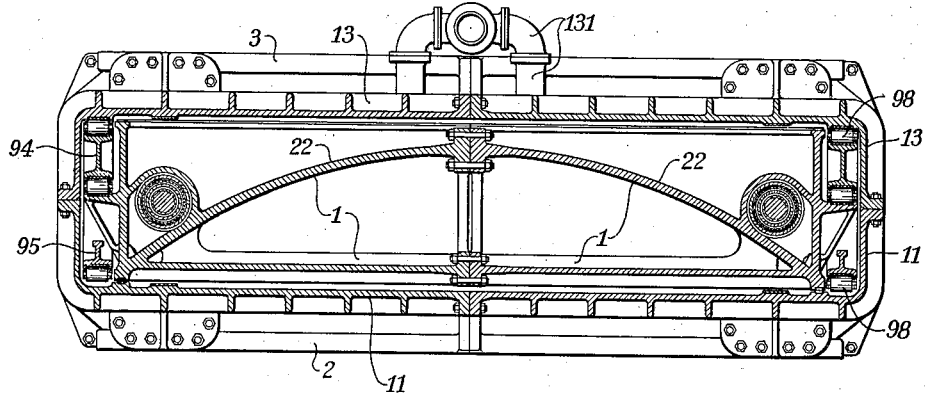
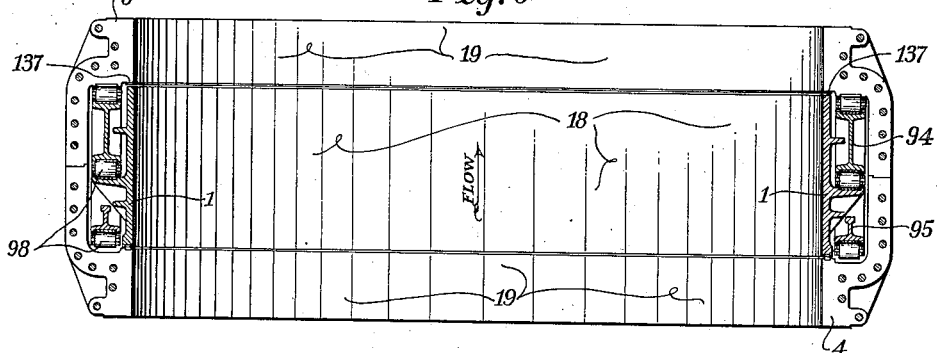
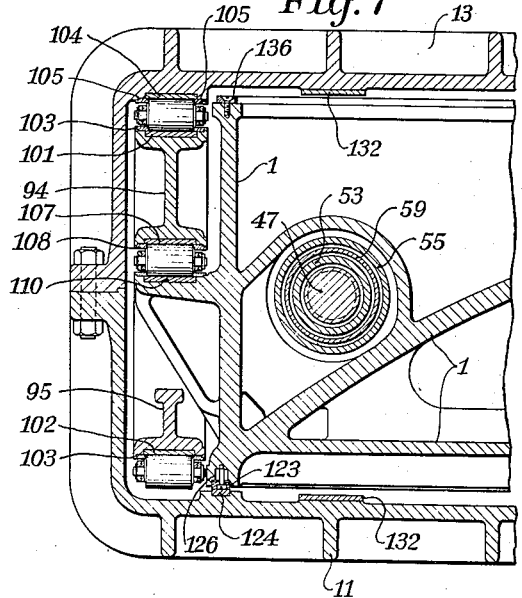
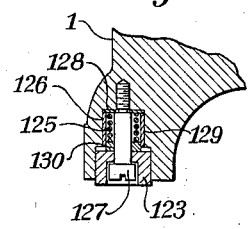

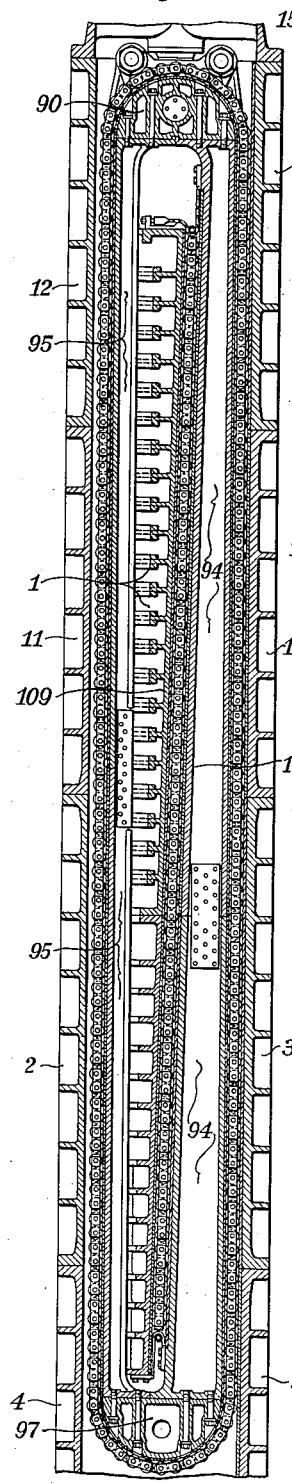

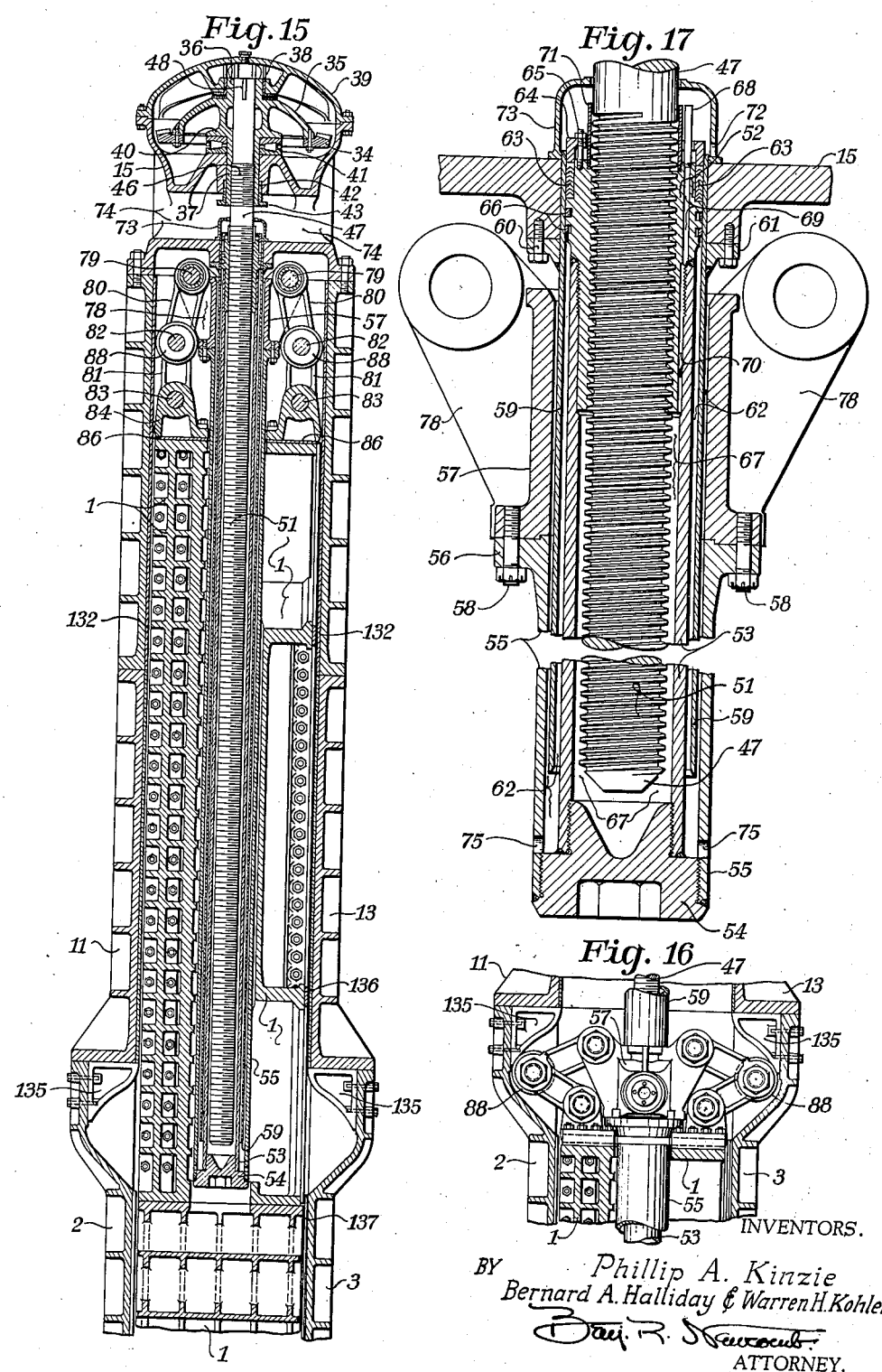

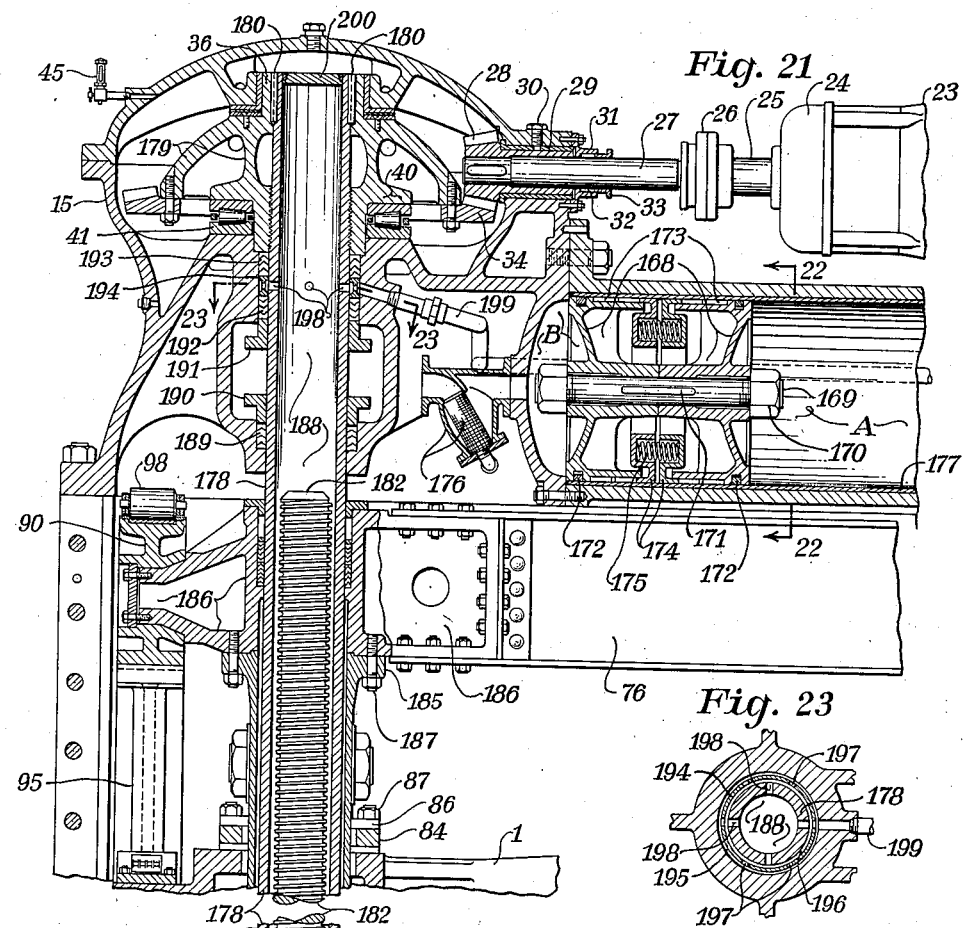
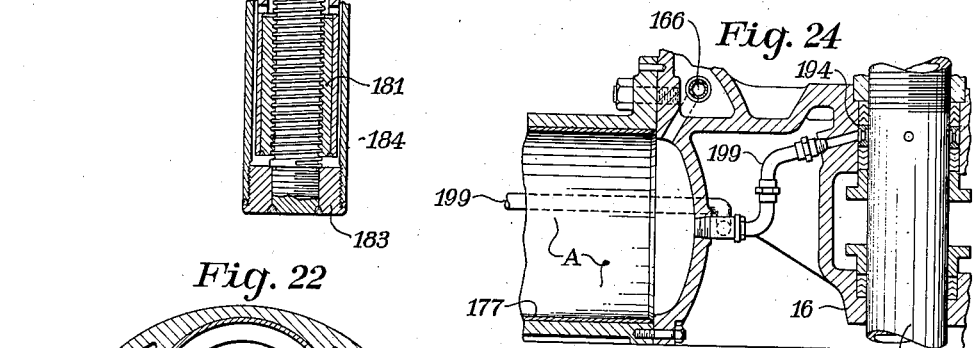
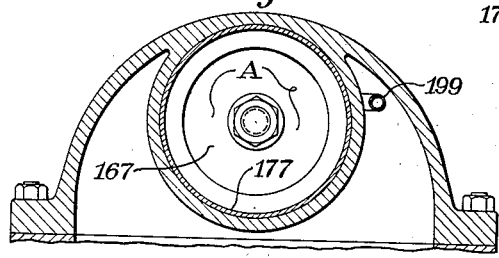

Patented Sept. 27, 1938

2,131,051

UNITED STATES PATENT OFFICE

2,131,051

INTERNAL STEM OPERATED TRACTOR GATE

Phillip A. Kinzie, Bernard A. Halliday, and Warren H. Kohler, Denver, Colo., assignors to Universal Hydraulic Corporation, Denver, Colo., a corporation of Colorado Application December 28, 1935, Serial No. 56,418

5 Claims. (Cl. 251—51)

This invention relates to improvements on roller gates, such as are used to interrupt the flow of a fluid through an orifice, pipe, conduit, or penstock. In general, our invention relates to gates wherein closure is effected by means of a roller-mounted leaf or closure element, contained within a housing and operated by twin hoisting means, mounted integral with the housing members. More particularly, our invention relates to improvements on gates employing the principle of operation disclosed in the application filed by Phillip A. Kinzie February 8, 1933, Serial No. 655,803.

The trend in modern hydraulic practice is toward the employment of larger conduits and penstocks; and since all such conduits and penstocks must be provided with gates, valves, or some such closure device, the type of such closure devices which will yield a maximum efficiency and yet will be compact and simple in design becomes an absolute necessity. In the type which is our invention, the fluidway through the gate is made to conform to the shape of the fluidway of the connected conduit or penstock, a feature which insures a maximum efficiency for fluid flow.

In order to minimize the overall height of these gates it is essential that the hoisting stem elements be contained within the area defined by the gate and the hoist housings. This is important so that the overhead clearance requirements for the gate will not necessitate excessive building heights or clearance requirements for traveling or gantry cranes. Too, by confining the hoist stems within the gate housing, the stems are protected against being struck and damaged while in the raised position. In addition, the arrangement of the internal stem elements is such that they form an oil reservoir in which the stems are immersed. In short, the invention provides a compact and efficient gate for the interruption of fluid flow through a conduit, penstock, or orifice.

Our invention also has as an object, the arrangement of a gate unit wherein all the elements comprising the structure will be confined within the area defined by the housing and integral hoist case members.

A further feature is a hoisting means whereby dual stem elements are employed to raise and lower the leaf or closure member; and wherein said stem elements and leaf member are contained within the area defined by the housing and hoisting members.

Additionally the invention has as an object, the arrangement of the hoisting stem units within the gate whereby the stem elements telescope within one another during the raising or lowering of the gate leaf.

Still another feature of our invention is a means whereby the interior areas surrounding the hoisting stems are utilized as oil reservoirs to provide lubrication for the stems.

Our invention has as another object, a means whereby a cylinder and piston through the medium of the fluid passing through or contained within the leaf housing members produces an oil pressure on the interior surfaces of the stem elements equal to the pressure imposed on the exterior surfaces of said stem elements.

Our invention has also as an object, an improved arrangement of the roller trains, wherein the rollers travel around a continuous oval-shaped track and wherein the central wedge rollers are positively and adjustably positioned by means of chains attached to the upper and lower termination thereof.

A spring loaded packing gland which automatically compensates for wear of the packing is another object of the invention.

Also our invention has as an object a twin toggle mechanism which will maintain the leaf and roller trains in the proper relationship at all times; yet will not impose lateral thrusts upon the leaf or stem elements.

The means whereby large size valves may be sectionalized to facilitate manufacture and transportation thereof is another feature of our invention; and a gate, compact in design, efficient in hydraulics and neat in appearance is also an object of our invention.

With the foregoing features and objects in view, there will now be described, for the purpose of satisfying the patent statutes, specific embodiments of the invention which have been illustrated in the accompanying drawings forming a part hereof, and wherein:

Fig. 1 is a side elevation of a complete valve unit.

Fig. 2 is a half elevation and a half sectional view looking upstream along the axial center-line of flow, and is taken on the plane 2—2 of Fig. 1.

Fig. 3 is a sectional view taken on the plane 3—3 of Fig. 2.

Fig. 4 is a sectional view looking downstream along the axial center-line of flow, and is taken on the plane 4—4 of Fig. 1.

Fig. 5 is a sectional view taken on the plane 5—5 of Fig. 4.

Fig. 6 is a sectional view taken on the plane 6—6 of Fig. 4.

Fig. 7 is an enlarged sectional view of a portion of Fig. 5.

Fig. 8 is an enlarged sectional view of a portion of Fig. 7.

Fig. 9 is a sectional view taken on the plane 9—9 of Fig. 4.

Fig. 10 is a sectional view along a plane identical to that of Fig. 9, but with the gate leaf in the extreme lowered position.

Fig. 11 is a sectional view taken on the plane 11—11 of Fig. 10.

Fig. 12 is a sectional view taken on the plane 12—12 of Fig. 10.

Fig. 13 is a side view of a typical roller and linkage assembly.

Fig. 14 is a sectional view taken on the plane 14—14 of Fig. 13.

Fig. 15 is a sectional view taken on the plane 15—15 of Fig. 4.

Fig. 16 is a sectional view showing the gate leaf, stems and toggles in the completely lowered position and is taken along a plane similar to Fig. 15.

Fig. 17 is an enlarged sectional view of the stem assembly.

Fig. 18 is a partial sectional view of an alternative type of stem arrangement.

Fig. 19 is a sectional view taken on the plane 19—19 of Fig. 18.

Fig. 20 is an enlarged portion of Fig. 19 showing the arrangement of the packing gland.

Fig. 21 is a partial sectional view of a second alternative type of stem construction.

Fig. 22 is a sectional view taken on the plane 22—22 of Fig. 21.

Fig. 23 is a sectional view taken on the plane 23—23 of Fig. 21.

Fig. 24 is a sectional view showing the connections from the oil cylinder to the stems.

In the accompanying drawings Figs. 1 to 17 inclusive illustrate a complete valve; Figs. 18 to 20 illustrate one arrangement of the stem assembly; and Figs. 21 to 24 inclusive illustrate another arrangement of the stem assembly. In all of the figures identical parts are designated by the same reference numerals.

By reference to the accompanying drawings, Figs. 1, 2 and 3, it will be seen that the leaf 1 is encased by the upper upstream frames 2, upper downstream frames 3, lower upstream frames 4, lower downstream frames 5, lower upstream bonnets 6 and 7, lower downstream bonnets 8 and 9, bottom bonnet cover 10, upper upstream bonnets 11 and 12, upper downstream bonnets 13 and 14, the hoist cases 15 and 16, and the upper bonnet cover 17. With the leaf 1 in the raised position (Figs. 2 and 3) the circular fluidway 18 through the leaf coincides with the circular fluidway 19 through the frame members 2, 3, 4, and 5; thus when the leaf is raised and the gate is wide open, the fluidway through the gate conforms in shape with the connected fluid carrying members 20 and 21. This construction allows the gate to be made very short inasmuch as costly and inefficient transition sections of the fluidway are unnecessary. When closure of the fluidway is desired, the leaf 1 is lowered and the bulkhead portion 22 of the leaf closes the fluidway 19 and stops further passage of fluid therethrough.

The leaf 1 is raised or lowered by a twin hoist unit mounted upon the upper flanges of the upper upstream and downstream bonnets 12 and 14 (Figs. 4 and 15). The motor 23 has the speed reduction units 24 attached to both ends and forming an integral part thereof. The drive shafts 25 which extend outward from the reduction units terminate and are securely keyed in the flexible couplings 26. The pinion shafts 27, which are in keyed engagement with the flexible couplings, are received within the bores of the bevel pinions 28 and are securely keyed therein. Each bushing 29 receives the extended hub of a pinion 28 and is locked against rotation by the set screw 30. The stuffing box 31 with the packing 32 and the gland 33 renders the gear case oil tight at this point. A bevel gear 34 is in mesh with each bevel pinion 28 and is bolted to the centralizing or hub member 35 which has an upwardly extending hub portion 36 and downwardly extending hub portions 37. The hub portions 36 are centralized within the bushings 38 which are pressed into gear case covers 39. The hubs 37 are centralized within bores in the hoist cases 15 and 16 and each has at its upper termination a flanged portion 40 which rests upon the anti-friction roller thrust bearing 41. Oil tightness is insured around the downwardly extending hubs 37 by means of the packings 42 and the glands 43 so that the hoist cases may be filled with oil through the removable covers 44 to the level desired and indicated on the level gauges 45. The threaded portions 46 on the stems 47 are matingly received within the downwardly extending hubs 37, and transfer the vertical load imposed by the leaf 1 to the hubs 37 whence it is transmitted to the thrust bearings 41. The keys 48 at the upper termination of the stems 47 prevent their rotation within the central bores in the hub members 35, thus rotation of the bevel gears 34 causes rotation of the hub members and stems.

A geared indication and control unit 49 registers the position of the leaf 1 and automatically stops the motor 23 when the gate leaf 1 is in either the wide open or in the fully closed position. The cover 50 encases and protects this unit.

The downwardly extending threaded portions 51 of the stems 47 (Figs. 15 and 17) are matingly received by the nuts 52 which are threaded and welded to the inner extension tubes 53. The lower end of each inner extension tube 53 is threaded and welded to the connection nut 54 which also has threaded and welded thereto the outer extension tube 55. The outer extension tube 55 terminates at the upper end in the flange 56 which is secured to one of the crosshead trunnions 57 (Figs. 4, 11 and 15) by the studs 58. The baffle tube 59 is interposed between the inner and outer extension tubes and is connected to the hoist case by bolts 60 through the flange portion 61. Since the space 62 between the tubes 53, 55, and 59 is filled with the fluid passing through the gate, to prevent the escape of this fluid the packing 63, which is retained by the gland 64 and the studs 65, is provided between the lifting nut and baffle tube. In addition to this packing the dual piston rings 66 serve to prevent leakage, and permit the packing 63 to be replaced while the valve is in service in the full open (raised) position. These piston rings 66 also act as scrapers on the interior of the baffle tube 59 and remove any scale or corrosive deposits which might collect thereon, and thereby prolong the life of the packing 63.

The space 67 within the inner extension tube 53 is filled with a lubricating oil through the pipe 68 which is threaded into the lifting nut 52. A mating drilled hole 69 communicates with the groove 70 in the lifting nut and provides the means for filling the interior space 67 with oil. Several such filling holes are provided in order that air may escape from the interior space 67 while oil is being inserted therein. Thus it will be seen that when the leaf is raised the stems are immersed in a bath of oil.

The cylindrical baffle 71 which is attached to the lifting nut 52 prevents any small leakage which might occur, when the leaf and stem assembly are in the lowered position (Fig. 11) from entering the interior space 67 past the stem thread 51 by providing a reservoir in which such leakage is confined. Since the leakage past the packing 63 and piston rings 66 will be small, this additional area will be sufficient to accommodate this leakage; and when the leaf 1 is raised and the gland 64 again assumes the position as shown on Figs. 15 and 17, the collected water will be spilled out through the hole 72 in the split cap 73. The cap 73 is provided to prevent foreign matter from dropping into the space between the stems and baffle tube while the gate leaf and stem units are in the lowered position. It will be noted that the gland 64 is accessible from the exterior of the gate structure through the opening 74 in the hoist cases 15 and 16. This fact permits tightening the packing gland 64 with the gate leaf in the raised or open position.

The holes 75 at the bottom of the outer extension tube 55 are provided in order that the water will have to flow therethrough during the operating cycles of the gate and thus wash away any sediment or scale which may collect at this point. Too, these holes automatically drain the space between the inner and outer extension tubes when the conduit or penstock is emptied and thus prevent the hazard of retaining water within this space.

The crosshead trunnions 57 (Figs. 4, 11, and 15), which are attached to the crosshead beam 76 by the bolts 77, are provided with the lugs 78 which are bored to receive the pins 79. The links 80 are attached to the crosshead trunnions by the pins 79, and are connected to the lower links 81 by the pins 82. The pins 83 secure the lower links 81 to the sliding shoe 84. The extending tongues 85 on the shoe 84 are slidably received within a mating groove in the anchorage plates 86 which are secured to the leaf 1 by the studs 87. The rollers 88, which are interposed between the upper and lower links on the pins 82, perform a function which will later be described herein.

The trunnion elements 89 (Fig. 11) on the crosshead trunnions 57 enter mating bores in the upper carriage heads 90, and are clamped therein by means of the disks 91 and the bolts 92. The bolts 93 (Figs. 9 and 10) secure the wedges 94 and the idler tracks 95 to the respective upper carriage heads 90, and similar bolts 96 secure the lower carriage heads 97 to 94 and 95. This arrangement forms oval-shaped tracks around which the roller chains, composed of the rollers 98 and the links 99, travel while the gate is being raised or lowered. Each oval-shaped carriage is faced with non-corrodible tracks 100 on the carriage heads 90 and 97, 101 on the wedge 94, and 102 on the idler track 95. These non-corrodible tracks insure a permanently smooth surface upon which the roller trains travel. Guide strips 103 (Fig. 7) retain the roller trains on the oval-shaped carriages. Non-corrodible parallel tracks 104 with guide strips 105 are attached to the frame and bonnet members, and it is along these tracks that the roller carriages travel when the gate is being raised or lowered.

The sloping surface 106 on the interior of each wedge 94 is faced with a non-corrodible track 107 and is provided with guide strips 108 (Figs. 7, 9, and 10). A mating sloping surface 109 which is an integral part of the gate leaf 1 too has non-corrodible tracks 110 and guide strips. A string of rollers 98 is contained in the sloping groove thus formed between the gate leaf and the wedge, and thus affords a means for securing practically frictionless movement between each roller carriage and the leaf, a condition which is essential for efficient operation of the gate. The chains 111 and 112 (Fig. 10) are rigidly attached to the wedge by the clevis blocks 113 and bolts 114 and are looped around the pinions 115 at the upper and lower termination of the central roller train. The lower chain 111 has the other end rigidly secured to the leaf, by the clevis block 113 and the bolts 114, but the upper chain 112 is attached to the clevis member 116 which is adjustable by the studs 117. These studs 117 are securely retained by the sole plate 118 which is rigidly fastened to the gate leaf 1. This arrangement permits each central roller train to be adjusted to the proper position, and at the same time definitely retains the trains in the adjusted position.

The links 99 are retained in an identical manner on the rollers 98 for both the wedge roller trains and the roller trains around the roller carriages (Figs. 13 and 14). The extending hubs 119 on the rollers 98 are each grooved to receive a split collar 120 which has slots at 90° from the line of split. In assembling, the links 99 are slipped on the extending hubs 119, a lock washer 121 is placed on each extending hub, and a split collar 120 is inserted in the groove therein after which the "ears" 122 on the lock washers 121 are bent outward until they enter the slots in the split collars 120 and thus lock the links 99 on the rollers 98.

It is essential that the rollers 98 bear firmly on their respective rolling surfaces at all times while the gate is being moved. To accomplish this effect spring loaded slide bars 123 (Figs. 4, 7, and 8) are inserted in grooves on the upstream face of the gate leaf 1 and bear against mating stationary bars 124 fastened to the frame and bonnet members. The springs 125 which are inserted into counterbores 126 in the leaf 1 push each slide bar 123 against the mating bar 124 and produce a reaction which results in the leaf being held tightly against the rollers 98 and non-corrodible tracks, 101 and 104, also 107 and 110. The bolts 127 retain the slide bars on the leaf. The counterbores 126 are each lined with non-corrodible metal, the disk 128 on the bottom and the cylinder 129 on the sides. The disk 130, which is entered in the bore in each cylinder 129 and upon which the spring 125 bears, provides a means of transmitting frictional resistance, resulting from the sliding of 123 along 124, to the leaf by shear. In addition to holding the leaf tightly upon the rollers these spring loaded slide bars 123 exert a dampening effect upon the tendency of the leaf to vibrate during closure under unbalanced conditions. A further dampening effect is exerted by introducing air on the downstream face of the leaf through the manifold 131, (Figs. 1, 2 and 3). This tendency to vibrate is caused by a partial vacuum which is produced by the rapid fluid flow beneath the partially closed leaf.

The rollers 88 (Figs. 4, 15, and 17), together with the links 80 and 81, form a dual toggle mechanism between the crosshead members and the gate leaf. This arrangement is necessary in order to insure that the proper relationship is maintained between the crosshead and gate leaf during the operating cycle. With the leaf in the closed or partially closed position there is a tendency for the leaf to roll upward along the wedge surfaces of the roller carriages because greater water pressure is present on the upstream face of the leaf than is present on the downstream face of the leaf. This is the case during closure with a fluid passing through the valve. Unbalanced pressure between the upstream and downstream faces of the leaf produces a force perpendicular to the wedge surface which when broken up into horizontal and vertical components, produces a force tending to move the gate downstream and a force tending to roll the gate upward. At first glance, the weight of the leaf would seem to be sufficient to nullify this upward component; however, careful calculations show in many instances that even with slopes of less than one-quarter inch per foot, this component attains a magnitude in excess of the weight of the gate leaf. It is, therefore, necessary to provide a means of nullifying this upward component; the toggles perform this function. If the leaf tends to roll up the wedge planes the toggles tend to expand, but are restrained from so doing until the leaf comes to rest on the bars 133 by the tracks 132 on the upper bonnets. When the leaf has come to rest on the bars 133 and the rest beams 134 (Figs. 2 and 12), the rollers 88 will have begun to roll outward along the faces of the cams 135 (Fig. 16) which prevent the leaf from moving upward during the process of seating of the leaf. When the toggles are fully expanded (Fig. 16), the wedges will be completely lowered; and because of the slope of the wedge plane, the leaf will move downstream and the seat ring 136 (Figs. 2 and 7) on the bulkhead portion 22 of the leaf I will come to seat against the seat ring 137 on the frames 3 and 5 (Fig. 6). In order to insure proper alignment of the seat rings 136 and 137, each rest beam 134 is provided with adjusting screws 138 (Fig. 12) which press upward against the disk 139. Adjustment of the screws 138 is transmitted to each bar 133 by the disk 139 and the springs 140; thus adjustment of the screws 138 will vary the height of the rest bars 133 and permit the alignment of the seat rings 136 and 137. Another function of the springs 140 in the rest beams is to prevent shock when the gate leaf comes to rest on the bars 133.

It will be noted that on the drawings shown herein the leaf and housing members are shown as being made in sections. This is done to show the feasibility of manufacturing large gates of this type using reasonable and transportable component members; however, in smaller size valves the members can be made of fewer parts, since the size of the sections is determined by manufacturing and transportion facilities.

Figs. 18, 19, and 20 show one alternate stem arrangement; and Figs. 21, 22, 23, and 24 show a second alternate. These alternates are similar in that they both employ "floating" pistons to maintain oil pressure within the stem encasing members at a pressure equivalent to external fluid pressure surrounding the immersed parts, and in that both arrangements employ self-adjusting stuffing boxes. Therefore, in describing these parts, reference will not be restricted to either alternate.

The first alternate has dual stems 141 which are secured to the hoisting mechanism and rotate with the bevel gears 34. The threads 142 on the downwardly extending portion of each of the stems 141 are received within the nut 143 (Fig. 19) which is welded within a counterbore in the inner tube 144. The lower termination of the inner tube 144 is threaded and welded to the plug 145 which has also threaded and welded thereto the outer tube 146. The upper portion of the outer tube terminates in a flange 147 which is attached to the crosshead trunnion 148 by the bolts 149. The sheath tube 150 is interposed between the inner tube 144 and the outer tube 146, and is welded into the cup member 151 which is secured to the underside of the hoist case 15 by the bolts 152. The packing 153 which is retained by the gland 154 and the studs 155, prevents the escape of water or fluid from the interior of the gate housing. In order to exclude water or fluid from the area inside the outer tube 146 and retain the oil therein, the crosshead trunnion 148 is counterbored (Figs. 19 and 20) to receive the packings 156 and 157 which are held firmly in place by means of the compression springs 158. These springs 158 press downward against the ring 159 while the upward reaction is taken by the gland insert 160 which is secured to the crosshead trunnion by the screws 161. The fillister head bolts 162, which are threaded into the ring 159 and which are received within counterbores in the gland insert 160, retain the springs 158 and ring 159 in assembly with the gland insert 160, should the unit be removed. It will be noticed that the springs 158 are given a considerable initial compression so that as the packings 156 and 157 wear the springs will expand automatically and compensate for the wear and thus maintain the stuffing box fluid tight. The packings 156 and 157 because of the V type construction also aid in securing fluid tightness of the stuffing box, by their inherent characteristics and by the relation in which they are placed in the counterbore in the crosshead. The lower packing 156 has the V's inverted and the upper packing 157 has the V's in an upright position; thus when oil percolates upward from the interior cavities around the stem and enters the spaces between the inverted V's, the pressure causes the V's to tend to flatten out and as a result the packing bears more tightly against the walls of the counterbore in the crosshead trunnion and against the exterior surface of the sheath tube 150. The upper packing 157 functions in an identical manner to exclude water from the interior cavities around the stem 141. Thus by means of a spring-loaded packing gland, and by a method of assembling the packings which utilizes to the best advantage the inherent characteristics of said packings, we secure a stuffing box which is effective against internal and external pressures and which will automatically compensate for wear of the packing elements.

Oil is introduced into the interior spaces 163 around the stems 141 through the holes 164 by the pipes 165 which are in communication with the cylindrical oil chamber A (Fig. 18). Chamber A is filled with oil through the hole 166, and after the stem spaces 163 as well as chamber A have been completely filled with oil through the hole 166 and the "floating" piston 167 occupies the position shown on Fig. 18, the hole 166 is plugged and the oil system is then ready for operation.

In order to build up a pressure in the oil reservoir system which will be equal to the internal pressure of the water passing through the valve, water is admitted to the chamber B through the screen unit 176. Thus the water pressure in chamber B causes the "floating" piston 167 to impress upon the oil in chamber A and its communicating pipes and spaces, a pressure equal to that of the water passing through and contained within the gate housing members.

The "floating" piston 167 (Figs. 18 and 21) is of a unique design. Two pressure heads 168 are held together by the stud 169 and the nuts 170. The key 171 prevents these heads from rotating with respect to each other. The heads 168 are grooved to receive the piston rings 172, and have the inwardly extending skirts turned down to a smaller diameter which receives the packings 173. The packing glands 174 have a series of mating cups in their inwardly extending flange portions into which the compression springs 175 are inserted. Since the compression springs 175 are interposed between the packing glands, the force therefrom is impressed upon both packings 173 and maintains them fluid tight. The springs 175 also automatically compensate for wear on the packings 173 by moving the glands outward as wear of the packings occurs. In order to provide a permanently smooth cylinder for the "floating" piston 167 to slide upon, the cylinder is provided with the non-corrodible liner 177.

During an operating cycle of the gate the "floating" piston 167 functions in a manner which will now be described. Assuming the gate leaf to be in the raised position with the stem elements in the relation shown of Figs. 18 and 19, proper rotation of the stems 141 will cause the leaf 1 to be lowered because it is connected through the toggles and crosshead trunnions 148 to the outer tubes 146 which in turn are integrally connected to the inner tubes 144 and lifting nuts 143. Since the stems 141 and the sheath tubes 150 do not travel downward during this operation, it is apparent that the downward travel of the inner and outer tubes 144 and 146 respectively will increase the cubical contents of spaces 163 within the encasing tubes; therefore it becomes necessary to supply additional oil to the interior stem spaces 163 in order that they may be maintained completely full of oil. The "floating" piston 167 not only maintains the interior spaces 163 full of oil but also maintains the oil within these areas at a pressure equal to the exterior water pressure. The oil which enters the areas within the outer tubes 146 is fed therein by the pipes 165 which are in communication with chamber A, which is the oil chamber. Because of the fact that water of a pressure equal to the pressure prevalent in the fluidway and leaf encasing members is admitted to chamber B, the water will impress upon the water side of the "floating" piston 167, a pressure which will be transmitted to the oil in chamber A; and since the relative area of both chambers A and B is equal, the pressures will be equal. Since fluid pressure is transmitted undiminished to all parts of a connected system, it is apparent that the oil pressure within the stem units will be equal to the pressure of the exterior water in which they are immersed. As the interior spaces 163 withdraw oil from chamber A, the "floating" piston will move to the right due to the force exerted thereon by water pressure in chamber B. During the time while the gate is being raised the reverse operation will take place.

As the hoist rotates the stems 141 in raising the gate, their action on the oil within the interior spaces is analogous to that of a hydraulic jack. As the stems are turned the inner and outer tubes as well as the leaf and associated parts are raised, and at the same time the oil within the spaces 163 is displaced and is forced back into chamber A through the pipes 165. This action causes the "floating" piston 167 to move to the left against the water pressure in chamber B. The water in chamber B consequently is forced out through the screen unit 176, an action which flushes out any sediment or particles which may have collected on the screen during the inflow of water to chamber B and prevents clogging the screen unit with foreign matter and trash which may be present in the water. When the leaf is completely raised the "floating" piston will occupy a position to the left of the centerline of the gate (approximately as shown on Fig. 18). It is to be understood that the phrases and words used herein which refer to the movement of the "floating" piston as being to the "right" or "left" are used only to clarify this particular application. We do not wish it to be construed that effectiveness of the principle involved herein is restricted to or dependent upon either direction or plane of operation of the elements involved.

It will be noted that the pressure on both sides of the packings 156 and 157 is equal at all times, and thus almost entirely nullifies any tendency for water to pass into, or for oil to escape from the interior stem spaces. To those skilled in the art it will be apparent that the principle involved in keeping the interior spaces around the stems completely filled with oil at a pressure equivalent to the exterior water pressure, can readily be applied to many other devices which require internal lubrication while submerged beneath a fluid; for example, a submerged bearing. Specific designs and applications of this principle to other mediums will be made at a future time.

The second alternate stem arrangement, shown on Figs. 21 to 24, is a somewhat modified arrangement of the first alternate. In this arrangement (Fig. 21) a lifting tube 178 is threaded into the bevel gear hub 179 and locked against rotation therein by the keys 180. A lifting nut 181 is received and welded within a counterbore at the lower end of the tube 178, and engages the threads on the stem 182. The stem 182 is threaded and welded into the cap 183 which is also connected to the outer extension tube 184. The outer tube 184 terminates in the flange 185 which is attached to the crosshead trunnion 186 by the bolts 187. A spring-loaded stuffing box identical in construction with the one which has already been described is inserted between the counterbore in the crosshead and the outer tube 184 and thus renders the space 188 within the outer tube fluid tight. Upward escape of water past the tube 178 to the outside of the hoist case is prevented by the packing 189 and the gland 190. A similar upwardly facing gland 191 and packings 192 and 193 prevent the escape of oil from the hoist case reservoir and at the same time prevent escape of oil from the interior stem spaces 188. The ring 194, which is interposed between the packings 192 and 193, is I shaped in cross-section and thus forms the outer annular passage 195 (Fig. 23) and the inner annular passage 196. The holes 197 provide communication between the outer and inner annular passages 195 and 196. The holes 198 provide communication between the inner annular passage 196 and the interior space 188 within the tube 178. Oil from chamber A is delivered to the outer annular passage 195 by the pipes 199 whence it is delivered to the space 188 through annular passages and the respective communicating holes. The cap 200 (Fig. 21) is welded in the top of the tube 178 to prevent the upward escape of oil into the hoist case.

The "floating" piston 167 functions in exactly the same manner as has already been described for the previous alternate, and thus maintains the interior space 188 completely full of oil at a pressure equal to that of the water within the gate housing.

The general arrangement and description for the remaining elements of the gate is exactly the same as has already been described in the earlier sections of this description.

While in the foregoing we have disclosed specific embodiments of our invention, it is, nevertheless, to be understood that in practicing the same we may resort to any and all modifications falling within the scope of the appended claims defining the invention.

We claim—

1. In a gate valve, a gate housing with a fluid passageway therethrough, a gate member within the housing movable transversely of the passageway and of sufficient dimension with respect thereto such that there is always on one side or the other in the open or closed position thereof a supporting and guiding length of gate member at least equal to the dimension of the gate opening, gate member operating means including at least one threaded non-rising stem engaging a cooperating element on the gate member, inclined plane means moving the gate member axially of the passage for seating and unseating the gate member, and means counteracting any tendency of the gate to move upwardly on the inclined plane means due to pressure on the gate member.

2. In a gate valve, a gate housing with a fluid passageway therethrough, a gate member within the housing movable transversely of the passageway, gate member operating means including at least one threaded non-rising stem engaging a cooperating element on the gate member, inclined plane means moving the gate member axially of the passage for seating and unseating the gate member, and means counteracting any tendency of the gate to move upwardly on the inclined plane means due to pressure on the gate member.

3. In a gate valve, a gate housing with a fluid passageway therethrough, a gate member within the housing movable transversely of the passageway, gate member operating means including a threaded non-rising element engaging a cooperating element on the gate member, inclined plane means moving the gate member axially of the passage for seating and unseating the gate member, and means including a toggle for counteracting any tendency of the gate to move upwardly on the inclined plane means due to pressure on the gate member.

4. In a gate valve, a gate housing with a fluid passageway therethrough, a gate member and a carriage therefor within the housing movable transversely of the passageway, gate member operating means including a threaded non-rising element engaging the carriage, inclined plane means between the carriage and the gate member for controlling movement of the gate member axially of the passage for seating and unseating, toggle means connecting said carriage and said gate for limited relative movement, and means limiting said toggle means in different degrees at different positions of gate member movement.

5. A reciprocating valve comprising a housing with a passageway for the flow of fluid therethrough, a gate member movable transversely of said passageway for opening and closing the same, operating means for said gate member including a threaded element and a plurality of telescoping tubular elements enclosing said threaded element and providing a lubricant-retaining chamber surrounding said threaded element, said tubular elements being connected respectively to said housing and said gate member, and means preventing leakage of line fluid into said chamber including means controlled by fluid flowing through the passageway for maintaining a pressure on the lubricant in said chamber at least equal to the line pressure.

PHILLIP A. KINZIE.
BERNARD A. HALLIDAY.
WARREN H. KOHLER.